United States Patent [19]

Doyle, Jr.

[11] 4,072,483

[45] Feb. 7, 1978

[54] VACUUM CLEANERS

[75] Inventor: Dewey I. Doyle, Jr., Grand Rapids, Mich.

[73] Assignee: Doyle Vacuum Cleaner Company, Grand Rapids, Mich.

[21] Appl. No.: 688,111

[22] Filed: May 20, 1976

[51] Int. Cl.² .......................................... B01D 46/02
[52] U.S. Cl. ..................................... 55/372; 55/467; 15/347
[58] Field of Search .................... 15/347; 55/372, 379, 55/485, 498, DIG. 2, 467

[56] References Cited

U.S. PATENT DOCUMENTS

| | | | |
|---|---|---|---|
| 2,639,001 | 5/1953 | Meyerhoefer | 55/379 X |
| 2,721,625 | 10/1955 | Lagerstrom | 15/347 X |
| 3,240,000 | 3/1968 | Hayes et al. | 55/498 X |
| 3,653,189 | 4/1972 | Miyake et al. | 55/372 X |
| 3,775,951 | 12/1973 | Eichholz et al. | 55/498 X |
| 3,841,067 | 10/1974 | Kato et al. | 55/498 X |

Primary Examiner—Christopher K. Moore
Attorney, Agent, or Firm—Emrich, Root, O'Keeffe & Lee

[57] ABSTRACT

A vacuum cleaner for picking up asbestos fibers, and the like, embodying a plurality of filters for affording a "fail-safe" type of protection against the discharge of accumulated materials from the cleaner, and in which the primary filter comprises a bag in which the picked-up material may be collected for subsequent safe and efficient disposal.

4 Claims, 4 Drawing Figures

VACUUM CLEANERS

BACKGROUND OF THE DISCLOSURE

This invention relates to vacuum cleaners, and more particularly, to vacuum cleaners which are particularly well adapted for picking up and collecting asbestos fibers, and the like.

It is a primary object of the present invention to afford a novel vacuum cleaner.

Another object is to afford a novel vacuum cleaner for effectively collecting asbestos fibers, and the like.

A further object is to afford a novel vacuum cleaner of the aforementioned type, from which asbestos fibers, and the like, which have been collected may be readily, safely and efficiently disposed of.

It has been found that the presence of certain materials, such as, for example, asbestos fibers, in the air breathed by people, is deleterious to the health of those people. In fact, certain regulations, such as the Occupational Safety and Health Act (OSHA) of the United States of America, have provisions strictly limiting the permissible concentration of certain materials in air, which will be breathed by people. For example, the standards for handling asbestos fibers as laid down under the aforementioned OSHA, presently are that the allowable eight hour time weighted average exposure shall not exceed five fibers longer than 5 micrometers per cubic centimeter of air, and this is expected to be reduced shortly to two such fibers per cubic centimeter of air—the maximum concentration for exposure not to exceed ten such fibers per cubic centimeter of air at any time.

In certain operations, such as, for example, in brake-service work on automotive vehicles, asbestos fibers are present in and on the parts of the equipment, such as, for example, brake drums, or the like, being worked on by a mechanic, or the like, as well as on the surrounding supporting surface, such as, for example, the floor of a garage, or the like. Asbestos fibers are commonly embodied in brake linings, and the like, and the wear of such brake linings, during operation of automotive vehicles, causes the aforementioned accumulations of the fibers to occur. During such brake-repair work, such accumulated fibers are displaced from surfaces on which they are disposed and freed to float in the air adjacent to those surfaces, and which air such mechanics, and other people in the vicinity may breath. It is an important object of the present invention to afford a vacuum cleaner which is operable to effectively remove such asbestos fibers, and the like, from such surfaces, in a manner effective to prevent the fibers from being present in the surrounding air.

The aforementioned picking up or accumulation of materials, such as aforementioned asbestos fibers, is only part of the problem. Another problem is the disposal of the thus accumulated or collected fibers. In fact, there are regulations, such as, for example, regulations under the aforementioned OSHA, as to how such disposal must be accomplished. Commonly, such regulations require that the accumulated asbestos fibers be placed in a nonporous container, such as, for example, a bag made of a suitable plastic material, such as polyethylene, and the container then be effectively sealed to prevent the escape of such fibers therefrom during handling and transporting of the containers to the disposal location. It is a further important object of the present invention to afford a novel vacuum cleaner which is operable to accumulate and collect asbestos fibers and the like, in such a manner that the thus collected fibers may be readily disposed of in the aforementioned manner.

Another object of the present invention is to afford a novel vacuum cleaner wherein materials picked up thereby are primarily accumulated and collected in a bag that has an inlet opening, and which bag is closed throughout its surface, except at the inlet opening, and which opening, in the operation of the vacuum cleaner is effectively sealed to the inlet connection of the cleaner.

Another object of the present invention is to afford a novel vacuum cleaner of the aforementioned type which embodies, in addition to the aforementioned filter bag, a plurality of other filters so as to afford a fail-safe construction to protect against discharge from the cleaner of asbestos fibers, or the like, which have been drawn into the cleaner, in the event of failure, by rupture, or the like, of the filter bag or one of the other filters; and, also, to afford a filtering system which is highly efficient in filtering from the air drawn into the vacuum cleaner particulate matter, even including minute dust particles, and the like, prior to discharge of the air from the cleaner.

Vacuum cleaners embodying filter bags of the type embodied in the preferred form of my present invention have been heretofore known in the art. In fact, vacuum cleaners of the type embodying the individual filters embodied in the preferred form of my invention have been heretofore known in the art. In addition, vacuum cleaners embodying a plurality of filters therein have been heretofore known in the art, being shown, for example, in Lagerstrom U.S. Pat. No. 2,721,625, Glidden U.S. Pat. No. 2,785,767 and Okan U.S. Pat. No. 3,358,316. It is to be observed that, in addition to embodying a plurality of filters, the aforementioned Lagerstrom patent No. 2,721,625 and Okan Pat. No. 3,358,316 each embodies a filter bag connected to the inlet connection of the cleaners disclosed therein, with the bag being closed throughout its surface except at the aforementioned connection with the inlet connector. However, it is to be observed that vacuum cleaners of the aforementioned type, which embody the individual filters of the type embodied in the preferred embodiment of the present invention, and vacuum cleaners of the type embodying a plurality of filters, such as, for example, the vacuum cleaners shown in the aforementioned three patents, commonly have had certain inherant disadvantages, such as, for example, being inefficient in the removal of particulate matter from air passing through the cleaners; being so constructed that it is difficult to empty from the cleaner particulate matter which has been accumulated therein; being complicated in construction and operation; being difficult and expensive to manufacture; or being ineffective and inefficient in operation, and the like. It is another object of the present invention to overcome such disadvantages.

A further object of the present invention is to afford a novel vacuum cleaner of the aforementioned type which is practical and efficient in operation, and which may be readily and economically produced commercially.

Other and further objects of the present invention will be apparent from the following description and claims and are illustrated in the accompanying drawings which, by way of illustration, show preferred embodiments of the present invention and the principles thereof and what I now consider to be the best mode in which I have contemplated applying these principles. Other embodiments of the invention embodying the same or equivalent principles may be used and structural changes may be made as desired by those skilled in the art without departing from the present invention and the purview of the appended claims.

DESCRIPTION OF THE EMBODIMENT SHOWN HEREIN

Figure 1:
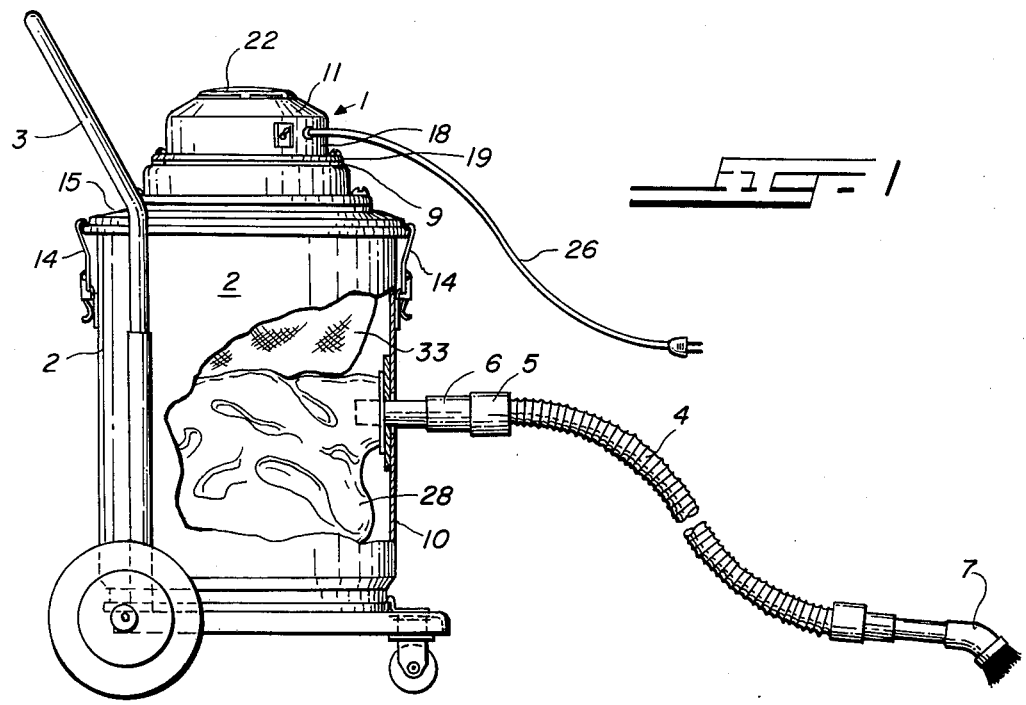
FIG. 1 is a side elevational view, with certain portions broken away to show underlying parts, of a vacuum cleaner embodying the principles of the present invention.
Figure 2:
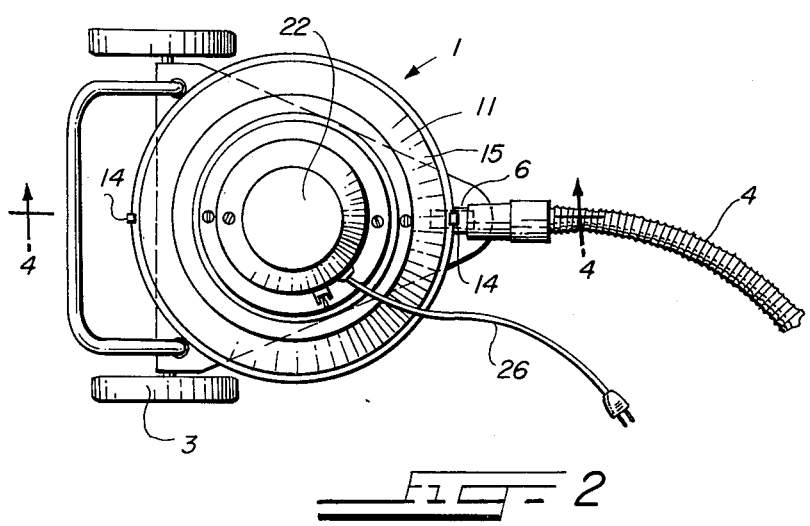
FIG. 2 is a top plan view of the vacuum cleaner shown in FIG. 1.

A vacuum cleaner 1, embodying the principles of the present invention, is shown in the drawings to illustrate the presently preferred embodiment of the present invention.

Figure 4:
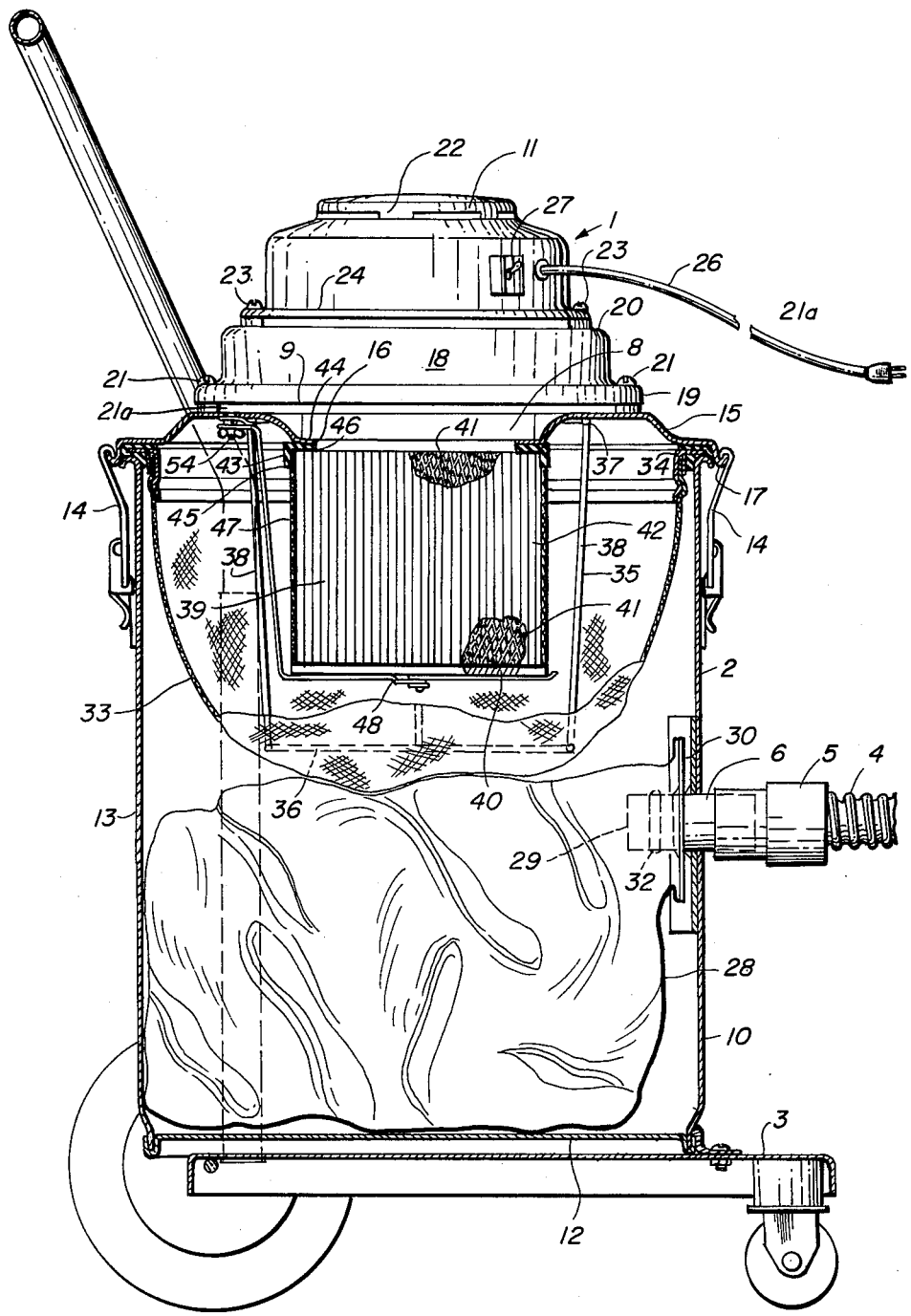
FIG. 4 is an enlarged, fragmentary sectional view taken substantially along the line 4—4 in FIG. 2.

The vacuum cleaner 1 embodies, in general, a housing or casing 2 mounted on a cart or dolly 3, FIGS. 1 and 4. An elongated hose 4 has one end 5 connected to an inlet connector 6 on the casing 2, and a pickup nozzle 7 mounted on the other end thereof. A combination motor-blower unit 8, which is of a type readily available on the market, is mounted in the upper end portion of the casing 2, and is effective, during operation of the vacuum cleaner 1, to draw air into the casing 2 through the inlet connector 6 and discharge the air outwardly through a discharge outlet 9 in the upper end portion of the casing 2. Preferably, the hose 4 has an inside diameter of 1½ inches, and the motor-blower unit is capable of drawing air therethrough at a rate of 115 cubic feet per minute. Vacuum cleaners of this general type have been heretofore known in the art, being shown, for example, in Dewey I. Doyle, United States Letters Pat. No. 2,956,734, issued Oct. 18, 1960.

The casing 2 of the vacuum cleaner 1, shown in the drawings, embodies an open-topped tank 10 having a cover 11 removably mounted thereon. The tank 10 embodies a closed bottom wall 12 and a cylindrical-shaped side wall 13 projecting upwardly from the outer peripheral edge portion of the bottom wall 12. The inlet connector 6, which is in the form of a pipe, is sealingly mounted in, and extends through the side wall 13 substantially midway between the bottom wall 12 and the top of the tank 10, FIG. 4. Manually operable clamps 14 are disposed on opposite sides of the upper edge portion of the side wall 13 for releasably securing the cover 11 on the tank 10 in covering relation to the open upper end thereof.

The cover 11 includes a substantially round, annular base plate 15, having a central opening 16 therethrough and an upwardly-concave flange 17 extending around the periphery thereof. The base plate 15 is of such size that, in the assembled cleaner 1, it may rest upon the upper end of the tank 10, in covering relation thereto, with the flange 17 projecting outwardly beyond the tank 10 in position to be operatively engaged by the clamping members 14 in position to releasably hold the base plate 15 on the tank 10.

The cover 11 also includes a ring member 18 having a lower flange 19 and an upper flange 20. The ring member 18 is secured to the upper face of the base plate 15, in axial alignment with the opening 16 through the base plate 15, by suitable means such as screws 21, FIG. 4.

The cover 11 also includes a top cover plate or dome 22 mounted on top of the ring member 18 and secured to the ring member 18 by suitable means such as screws 23 extending downwardly through an outwardly projecting, peripheral flange 24 on the dome member 22 into the flange 20 of the ring member 18.

Spacer members 21a are disposed on the respective bolts 21, between the ring member 18 and the base plate 15. With this construction, the ring member 18 is spaced upwardly from the base plate 15 to afford the aforementioned outlet passageway 9 through which air may be discharged from the interior of the casing 2.

In the assembled vacuum cleaner 1, the combination motor-blower unit 8 is mounted in the cover 11, between the base plate 15 and the dome 22, with the lower end of the motor-blower unit 8 resting on the upper face of the base plate 15, FIG. 4. The motor-blower unit 8 embodies an inlet 25, FIG. 3, to the blower portion thereof, which is disposed immediately above, and in axial alignment with the central opening 16 in the base plate 15. The motor of the motor-blower unit 8 may be connected to a suitable source of electric power, not shown, by suitable means such as, for example, an electric cord and the operation thereof may be controlled, in the usual manner, by suitable control means such as for example, a switch 27 mounted in the hood 20, FIGS. 1 and 4.

The vacuum cleaner 1 includes a primary filter in the form of a collector bag or filter bag 28, FIGS. 1 and 4, which, in the assembled vacuum cleaner 1 is operatively connected to the inner end portion 29 of the inlet connector 6. The bag 28 may be made of any suitable material, but, preferably, is made of paper, and is of a type readily available on the market. It includes a reinforcing plate 30, FIG. 3, made of suitable material, such as, for example, cardboard, having an inlet opening 31 therethrough. The inlet opening 31 preferably is normally closed by a readily penetratable sheet of material such as, for example, thin latex rubber disposed between the reinforcing plate 30 and the bag 28, and adhesively secured thereto.

When the tank 10 is open and empty, the bag 28 may be quickly and easily mounted on the inner end portion 29 of the inlet connector 6 by lowering the bag into the tank 10 and inserting the inner end portion 29 of the connector 6 through the inlet opening 31 in the bag 28, rupturing the aforementioned thin sheet of material, normally covering the opening 31. The inner end portion 29 of the connector 6 preferably has an annular rib 32 extending therearound and projecting outwardly therefrom, FIG. 4, and in mounting the bag 28 on the connector 6, the opening 21 is moved past the rib 32, so that the latter affords a restraint against accidental dislodgment of the bag 28 from the connector 6. The opening 31 in the bag 28 preferably is of such a size that, when it is disposed in operative position on the inner end portion 29 of the connector 6, it engages the outer periphery thereof with a relatively snug, but freely slidable, frictional fit.

A secondary filter in the form of an open-topped bag 33, which is of a type readily available on the market, is included in the vacuum cleaner 1. The body portion of the bag 33 may be made of any suitable material, but preferably is made of a suitable fabric, such as, for example, twill or nylon. The bag 33 is afforded with an outwardly projecting flange 34, which is adapted to rest on top of the side wall 13 of the tank 10, and to be clamped between the base plate 15 of the cover 11 and the upper edge portion of the tank 10 when the vacuum cleaner 1 is disposed in assembled condition.

A filter hold-down unit, in the form of an open cage 35 is mounted on the lower face of the base plate 15 of the cover 11. The cage 35 may be made of any suitable material, such as, for example, steel wire, and embodies a lower ring 36 supported from an upper ring 37 by a plurality of spaced legs 38, FIGS. 3 and 4. The upper ring 37 is secured to the lower face of the face plate 15 of the cover 11 by suitable means, such as, for example, welding, in outwardly spaced, concentric relation to the inlet opening 16 through the face plate 15. In the assembled vacuum cleaner 1, the cage 35 projects downwardly into the filter bag 33 and is effective to prevent it from moving upwardly any appreciable distance when the vacuum cleaner 1 is in operation.

Figure 3:
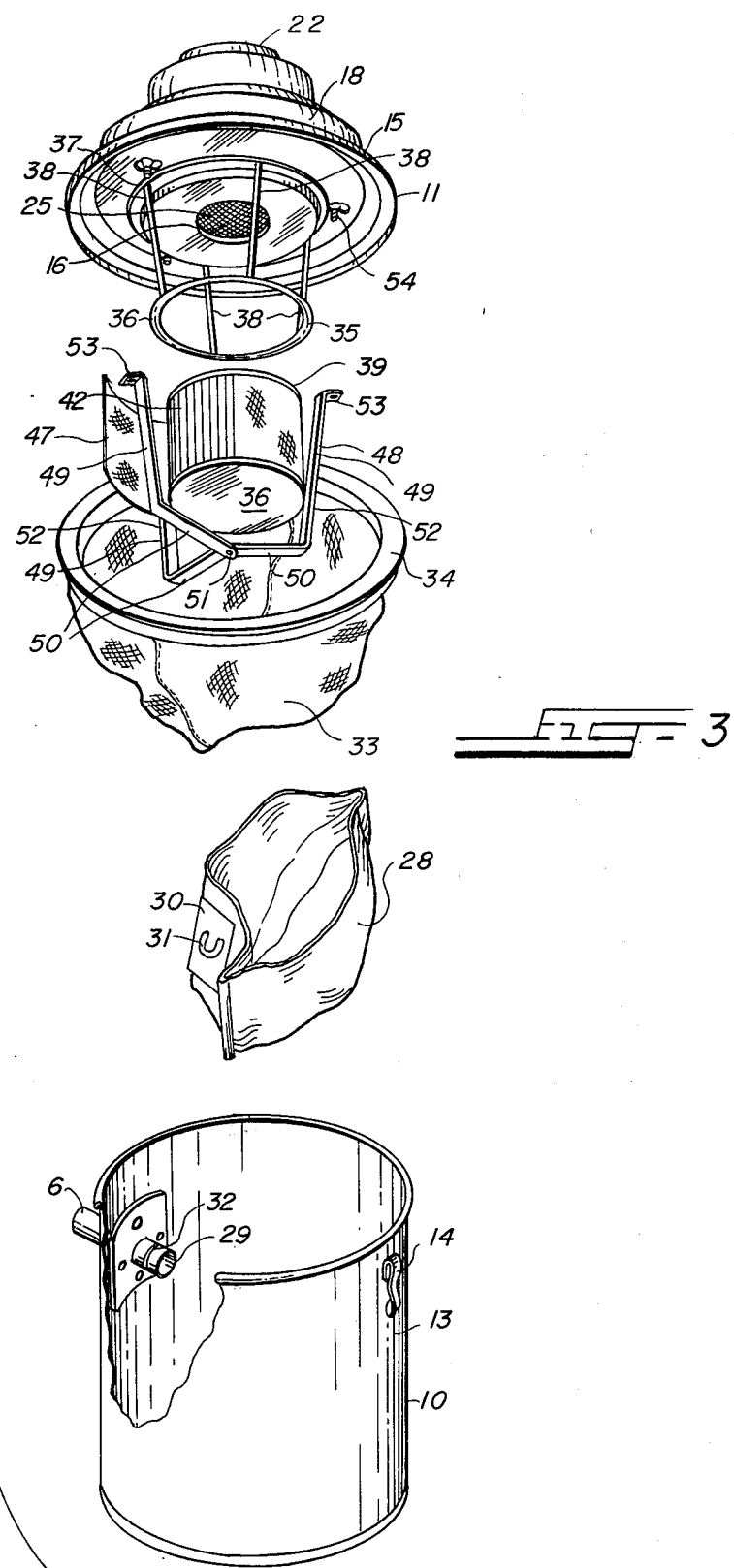
FIG. 3 is an exploded, fragmentary, perspective view of parts of the vacuum cleaner shown in FIG. 1.

The vacuum cleaner 1 embodies a third filter, in the form of a filter cartridge 39, FIGS. 3 and 4. The filter cartridge 39, in the preferred embodiment of the present invention, is of a type readily available on the market, and includes a closed bottom in the form of a round plate 40 made of suitable material, such as, for example, tin. A perforated, cylindrical shaped side wall 41, made of any suitable material, such as, for example, expanded metal, is secured to the bottom wall 40 by suitable means, such as welding, and projects upwardly from the outer peripheral edge portion of the latter. A filter member of filter sheet 42, which may be made of any suitable material, but which preferably is made of a sheet of corrugated paper, extends around the side wall 41, in covering relation thereto, between the bottom wall 40 and the top of the side wall 41. A retainer ring 43, which embodies an upper, inwardly projecting, annular flange 44 and a downwardly projecting annular flange 45 is mounted on the upper edge portion of the side wall 41 and the filter sheet 42, with the flange 44 resting on top of the side wall 41, and defining an outlet opening 46 in the top of the filter 39. The flange 45 of the retainer ring 43 projects downwardly from the top of the side wall 41 in overlying relation to the filter sheet 42 and is effective to hold the same in operative position on the side wall 41.

The cartridge 39, also, preferably embodies a wraparound filter paper 47, which in the fully assembled filter cartridge 39 extends around the outer peripheral surface of the filter sheet 42, in covering relation thereto, between the lower edge of the retainer ring 43 and the upper face of the bottom plate 40. In its assembled positon on the filter sheet 42, the filter paper 47 affords a protective coating therefor, which is operable to protect the outer surface of the filter sheet 42 from the accumulation of particulate matter thereon. The end portions of the filter paper 47 preferably are releasably secured by a releasable adhesive, not shown, so that, if, during the operation of the vacuum cleaner 1, an excessive amount of dust or other particulate matter accumulates on the outer surface of the filter paper 47, the filter paper 47 may be quickly and easily removed and replaced by another clean filter paper 47. In this manner, the main portion of the filter cartridge 39, including the filter sheet 42 may be used for a relatively prolonged time before it is discarded, the filter sheets 47 being quickly and easily replaced from time-to-time during that same period of time.

In the assembled vacuum cleaner 1, the filter cartridge 39 is releasably mounted on the cover 11, in depending relation thereto, with the upper flange 44 of the retainer ring 43 disposed in abutting engagement with the lower face of the base plate 15, in surrounding relation to the inlet opening 16 through the latter, by a spider-type supporting member 48, FIGS. 3 and 4. The supporting member 48 embodies three substantially L-shaped members 49, the three end portions of the lower legs 50, of which, are pivotally secured together by suitable means such as a rivet 51. The side or upright legs 52 of the members 49 have outwardly projecting flanges 53 on the upper ends thereof, and in the assembled vacuum cleaner unit 1, the flanges 53 are releasably secured to the lower face of the base plate 15 of the cover 11 by suitable means, such as bolts 54, which extend therethrough. In assembled position in the vacuum cleaner 1, the bottom legs 50 of the supporting member 48 are disposed in closely underlying, supporting relation to the filter cartridge 39, in position to effectively firmly hold the top thereof in abutting engagement with the lower face of the base plate 15 of the cover 11. In the assembled vacuum cleaner 1, the cartridge 39 is disposed within the cage 38, so that the latter is effective to hold the filter bag 53 downwardly and outwardly relative to the cartridge filter 39 in position wherein there is no danger that the filter bag 33 will engage the cartridge 39.

In the operation of the vacuum cleaner 1, when air is being drawn in through the inlet 6 and discharged from the outlet 9, it passes into the cartridge filter 39 through the filter paper 47, the filter sheet 42 and the perforated side walls 41, and passes outwardly from the cartridge filter 39 through the exit opening 46, from which it passes upwardly through the inlet opening 16 in the base plate 15 and outwardly through the discharge opening 9 in the cover 11 to the atmosphere.

In the operation of the vacuum cleaner 1, when the latter is in fully assembled position, as hereinbefore described and as shown in FIGS. 1 and 4, the motor-blower unit 8 is effective to draw air inwardly through the nozzle 7, the hose 4 and the inlet connector 6 into the filter bag 28. The air passes through the wall of the filter bag 28 into the interior of the tank 10, below the filter bag 33, and then passes upwardly through the wall of the filter bag 33 into the interior of the tank 10 above the filter bag 33. From the upper portion of the tank 10, the air then passes through the filter paper 47, the filter sheet 42 and the perforated side wall 41 of the filter cartridge 49 into the interior of the latter, from which it passes upwardly through the outlet opening 46 in the filter cartridge 39, the inlet opening 16 in the base plate 15 of the cover 11, the blower portion of the motor-blower unit 8 and outwardly through the discharge outlet 9 in the cover 11 to the atmosphere. During such passage of air through the vacuum cleaner 1, the filter bag 28 acts as the primary filter for the unit, which, when the bag 28 is in unruptured condition, normally is effective to withdraw substantially all particulate matter, such as dust, asbestos fibers, and the like, passing into the tank 10 through the inlet connectors 6 from the air, prior to the air passing outwardly through the filter bag 28. However, if the bag 28 should become ruptured, or if, for other reasons, it does not operate in the aforementioned manner, the secondary filter in the vacuum cleaner 1, afforded by the filter bag 33, affords highly effective protection against the passage of particulate matter, including matter such as the aforementioned asbestos fibers outwardly from the vacuum cleaner 1.

In addition, if the filter bag 33 should become ruptured, or if it should not operate in the desired manner for some other reason, the filter cartridge 39 affords a third effective filter for protecting against the escape of particulate matter, such as, for example, the aforementioned asbestos fibers, which has been drawn into the tank 10, from the vacuum cleaner 1 through the discharge outlet 9.

Thus, the three filters 28, 33 and 39 not only afford a back up or fail-safe system, which protects against the accidental discharge of particulate matter, such as asbestos fibers, or the like from the vacuum cleaner 1, in the event that one, or even two of the filters 28, 33 or 39 should rupture, or otherwise fail, but they also afford a filtering system which is highly effective to protect against the discharge from the vacuum cleaner 1 of minute particulate matter which might accidentally, or otherwise, pass through the filters.

It will be remembered that when material, such as the aforementioned asbestos fibers, or the like, is being collected, regulations require that the collected materials be placed in a sealed container when it is being transported, stored or otherwise handled prior to the disposal thereof. In the use of the vacuum cleaner 1, this may be readily accomplished. Thus, for example, after a use of the vacuum cleaner 1, and when it is desired to dispose of asbestos fibers, or the like, collected thereby, the power to the motor-blower unit 8 may be turned off, and the cover 11 may be removed from the tank 10. In the normal operation of the vacuum cleaner 1, the filter bag 33 may then be removed from the top of the tank 10 and the filter bag 28 may be manually grasped around the inlet portion 29 of the connector 6 and removed from the latter while maintaining a tight hold on the portion of the bag 28, adjacent to the inlet opening 31 thereinto, so as to prevent escape of particulate matter from the bag 28. The bag 28 may then be carefully placed in an over-sized bag made of suitable imperforate material, such as, for example, the aforementioned suitable plastic material, or the like, and the latter bag can be suitably sealed, such as, for example, by hermetically sealing it, against the escape of particulate matter, such as, for example, the aforementioned asbestos fibers, therefrom.

In the use of the vacuum cleaner 1, if desired, each time the filter bag 28 is removed and replaced, the filter bag 33 and the cartridge filter 39 may also be removed and replaced. With respect to the filter bag 33, this may be readily accomplished by merely placing it in a suitable container for disposal thereof when it is lifted from the top of the tank 10, prior to removal of the filter bag 28 from the tank 10. With respect to the filter cartridge 39, it may be readily removed, after the cover 11 has been removed from the tank 10, by loosening the bolts 54 and removing the supporting member 48 from its supporting relation to the filter cartridge 39, and then placing the latter in a suitable container for disposal thereof. In this latter regard, it is to be observed that, if desired, the cover 11 may be set on the cage 35, when the cover 11 is removed from the tank 10, so as to support the cartridge 39 and the supporting member 48 therefor in elevated, readily accessible position for such removal of the cartridge 39 from the cover 11.

However, in most instances, it will not be found necessary to replace the filters 33 and 39, each time that the filter bag 28 is removed and replaced. Normally, the filter 33 may merely be removed from the top of the tank 10, so as to afford access to the filter bag 28, and then reinserted into operative position in the tank 10 when the filter bag 28 has been replaced by a new filter bag 28. Similarly, normally the filter cartridge 39, which is removed from the tank 10, with the cover 11, when the latter is removed from the tank 10, may again be reinserted into the tank 10 when the cover 11 is again disposed in operative position thereon. When this occurs, it may be desirable to change the filter paper 47 of the cartridge filter 39. This may be readily accomplished by merely releasing the adhesively secured end portions of the filter paper 47 from each other, unwrapping the filter paper 47 from around the filter sheet 42 and placing the used filter paper 47 in a suitable container. Thereafter, a new filter paper 47 may be wrapped around the filter sheet 42 into operative position relative thereto, and the ends of the new filter paper 47 may be suitably secured to each other by suitable means such as, for example, the aforementioned releasable adhesive.

From the foregoing it will be seen that the present invention affords a novel vacuum cleaner.

In addition, it will be seen that the present invention affords a novel vacuum cleaner which is particularly well adapted for use in collecting deleterious materials, such as, for example, asbestos fibers, and the like, for suitable disposal thereof.

Also, it will be seen that the present invention affords a novel vacuum cleaner which affords a fail-safe type of operation which is effective to protect against failure of efficient operation of the unit.

Further, it will be seen that the present invention affords a novel vacuum cleaner wherein the parts thereof are constituted and arranged in a novel and expeditious manner.

Also, it will be seen that the present invention affords a novel vacuum cleaner embodying a plurality of filters, which are so disposed therein that all or any part thereof may be quickly and easily removed and replaced.

In addition, it will be seen that the present invention affords a novel vacuum cleaner which is practical and efficient in operation, and which may be readily and economically produced commercially.

Thus, while I have illustrated and described the preferred embodiment of my invention, it is to be understood that this is capable of variation and modification, and I therefore do not wish to be limited to the precise details set forth, but desire to avail myself of such changes and alterations as fall within the purview of the following claims.

I claim:

1. A vacuum cleaner comprising
   a. a casing comprising
      (1) a tank having
         (a) a closed bottom; and
         (b) an open top, and
      (2) a cover member
         (a) mounted on said open top, and
         (b) movable between open and closed position relative thereto, b. said tank having inlet means for feeding air thereinto,
c. said cover having outlet means for feeding air outwardly therethrough,
d. a combination motor-blower unit mounted in said cover for drawing air inwardly through said inlet means and discharge air outwardly through said outlet means when said cover is disposed in said closed position on said tank,
e. a filter bag removably mounted in said tank and operatively connected to said inlet means for filtering air passing from said inlet means to said outlet means,
f. a second filter removably mounted on said open top and extending thereacross in position to filter air passing from said filter bag to said outlet means,
g. a third filter releasably secured to and supported by said cover member in downwardly projecting relation thereto in a position to filter air passing from said second filter to said outlet means, and
h. means secured to and projecting downwardly from said cover in position to prevent said second filter from engaging said third filter.

2. A vacuum cleaner as defined in claim 1, and in which
a. said downwardly projecting means comprises an open cage, and
b. said third filter is disposed in said cage.

3. A vacuum cleaner comprising
a. a casing comprising
 (1) a tank, and
 (2) a cover member removably mounted on said tank in covering relation thereto,
b. said tank comprising
 1. a bottom wall,
 2. a substantially cylindrical-shaped side wall projecting upwardly from said bottom wall, and
 3. an open top,
c. said cover comprising
 1. a dome, and
 2. a base plate disposed below said dome in position to support the latter on said open top in upwardly projecting relation thereto,
d. said side wall having an inlet connector extending therethrough,
e. said cover having
 1. an air inlet passage extending through said base plate, and
 2. an air outlet,
f. a combination motor-blower unit mounted in said cover between said dome and said base plate and resting on said base plate in position to draw air from the surrounding atmosphere into said tank through said inlet connector and then from said tank into said cover and then outwardly through said air outlet out into the surrounding atmosphere,
g. a disposable filter bag mounted in said tank and releasably connected to said inlet connector for filtering air passing from said inlet connector into said tank,
h. a second filter bag having an open top,
i. said second filter bag
 (1) having a flange
  (a) around the upper periphery thereof, and
  (b) resting on said top of said tank, and
 (2) projecting downwardly into said tank in position to filter air passing from said first mentioned filter bag to said air outlet, and
j. a third filter removably mounted on said base plate in position to filter air passing from said second filter bag to said inlet passage through said base plate,
k. said third filter
 (1) projecting downwardly from said base plate and
 (2) being supported from said base plate by a supporting member which is releasably secured to said base plate,
l. said third filter comprising a cartridge filter including
 (1) a closed bottom,
 (2) a perforate side wall, and
 (3) an open top,
m. air passing through said third filter entering through said perforate side wall and exiting through said last mentioned open top,
n. said supporting member for said third filter comprising spaced elongated members having
 (1) lower portions underlying said closed bottom of said third filter, and
 (2) upper portions releasably secured to said base plate, and
o. said third filter being supported by said supporting member in position wherein said open top of said third filter is disposed in abutting engagement with the bottom face of said base plate in axial alignment with said inlet opening through the latter.

4. A vacuum cleaner comprising
a. a casing comprising
 (1) a tank, and
 (2) a cover member removably mounted on said tank in covering relation thereto,
b. said tank comprising
 (1) a bottom wall,
 (2) a substantially cylindrical-shaped side wall projecting upwardly from said bottom wall, and
 (3) an open top,
c. said cover comprising
 (1) a dome, and
 (2) a base plate disposed below said dome in position to support the latter on said open top in upwardly projecting relation thereto,
d. said side wall having an inlet connector extending therethrough,
e. said cover having
 (1) an air inlet passage extending through said base plate, and
 (2) an air outlet,
f. a combination motor-blower unit mounted in said cover between said dome and said base plate and resting on said base plate in position to draw air from the surrounding atmosphere into said tank through said inlet connector and then from said tank into said cover and then outwardly through said air outlet out into the surrounding atmosphere,
g. a disposable filter bag mounted in said tank and releasably connected to said inlet connector for filtering air passing from said inlet connector into said tank,
h. a second filter bag having an open top,
i. said second filter bag
 (1) having a flange
  (a) around the upper periphery thereof, and
  (b) resting on said top of said tank, and (2) projecting downwardly into said tank in position to filter air passing from said first mentioned filter bag to said air outlet, and
j. a third filter removably mounted on said base plate in position to filter air passing from said second filter to said inlet passage through said base plate,
k. said third filter
   (1) projecting downwardly from said base plate and
   (2) being supported from said base plate by a supporting member which is releasably secured to said base plate,
l. said third filter comprising a cartridge filter including
   (1) a closed bottom,
   (2) a perforate side wall, and
   (3) an open top,
m. air passing through said third filter entering through said perforate side wall and exiting through said last mentioned open top,
n. said supporting member for said third filter comprising spaced elongated members having
   (1) lower portions underlying said closed bottom of said third filter, and
   (2) upper portions releasably secured to said base plate,
o. said third filter being supported by said supporting member in position wherein said open top of said third filter is disposed in abutting engagement with the bottom face of said base plate in axial alignment with said inlet opening through the latter, and
p. an open cage
   (1) mounted on said base plate,
   (2) disposed around said third filter in outwardly spaced relation thereto, and
   (3) projecting downwardly from said base plate in position to
      (a) prevent said second filter bag from moving into engagement with said third filter when said cover is mounted on said tank in operative relation thereto, and
      (b) afford a support for supporting said cover member on a supporting surface, with said third filter, base plate and dome disposed in upwardly spaced relation to such a supporting surface, when said cover is removed from said tank.

* * * * *